No. 764,183. PATENTED JULY 5, 1904.
T. A. EDISON.
METHOD OF SEPARATING MECHANICALLY ENTRAINED GLOBULES
FROM GASES.
APPLICATION FILED NOV. 28, 1902.
NO MODEL.
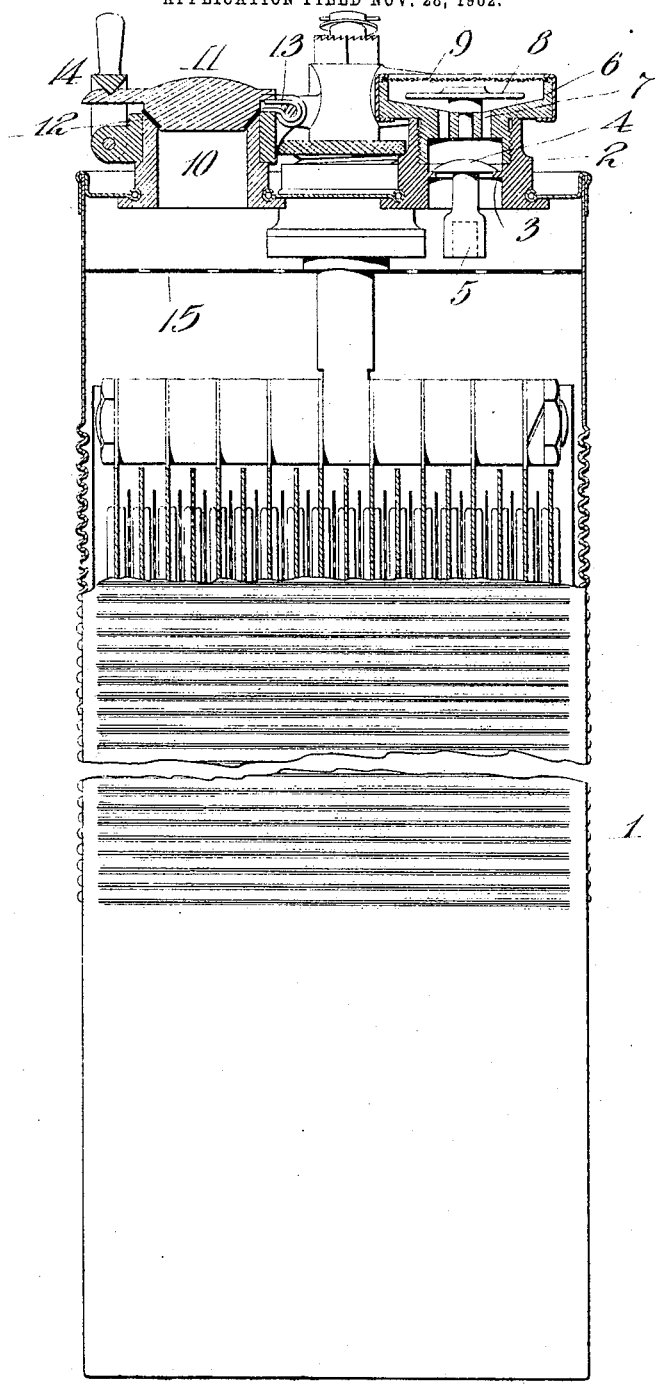
Witnesses:
Inventor No. 764,183.

Patented July 5, 1904.

UNITED STATES PATENT OFFICE.

THOMAS A. EDISON, OF LLEWELLYN PARK, NEW JERSEY, ASSIGNOR TO EDISON STORAGE BATTERY COMPANY, OF ORANGE, NEW JERSEY, A CORPORATION OF NEW JERSEY.

METHOD OF SEPARATING MECHANICALLY-ENTRAINED GLOBULES FROM GASES.

SPECIFICATION forming part of Letters Patent No. 764,183, dated July 5, 1904.

Application filed November 28, 1902. Serial No. 133,120. (No specimens.)

*To all whom it may concern:*

Be it known that I, THOMAS A. EDISON, a citizen of the United States, residing at Llewellyn Park, Orange, in the county of Essex and State of New Jersey, have invented a certain new and useful Improved Method of Separating Mechanically-Entrained Globules from Gases, of which the following is a description.

In the operation of storage batteries of the known types using either alkaline or acid electrolytes oxygen and hydrogen gases are generated at all times; but the production of gases is more pronounced during charging, and especially toward the end of that operation, which becomes very violent when overcharging takes place, particularly if the charging-current is considerable. These gases, being generated *in situ* within the electrolyte, rise to the surface thereof and, breaking through the surface tension of the liquid, become charged with an excessively fine spray of the solution by reason of the mechanical entrainment of the globules with the rising gases. The gases, carrying with them the mechanically-entrained globules, therefore accumulate in the upper part of the cell, can, or other receptacle and are forced out, through a vent or opening provided for that purpose, by the continued generation of additional quantities of gas within the electrolyte. The escaping gases, charged with the fine spray of the acid or alkaline solution, permeate the air in all directions in the neighborhood of the battery and being highly irritating to the mucous membrane of the nose and throat produce coughing and are otherwise objectionable to persons who may be within their influence. This objection has been especially noted in the case of storage batteries which have been used for street-railway traction and for the propulsion of automobiles. A further objection to the moisture-laden gases in question is that they deposit the acid or alkaline solution upon the cells or other receptacles and adjacent surfaces, producing oxidation and corrosion of metals in the case of acid electrolytes and resulting in softening, decomposing, and otherwise injuring woodwork when the deposited liquid is of an alkaline nature and in both cases very greatly increasing the liability of current leakage or actual short-circuiting. Finally, the carrying off from the electrolyte of mechanically-entrained globules by the escaping gases is further objectionable, inasmuch as the solution becomes thereby gradually depleted and requires to be replenished from time to time. This is extremely objectionable when the chemical must be replenished by the public or unskilled users. This is especially true in the case of ordinary lead batteries using acid electrolytes and with which the solution should not materially vary in specific gravity.

I have invented a method by which the mechanically-entrained globules which are carried out of the solution by the escaping gases can be effectively separated from the latter, so that the gases escape into the air in a dry and non-noxious condition, and hence entirely unobjectionable in the respects noted, while at the same time the separated liquid is permitted to return to the solution, so that it only becomes necessary to replenish the water at relatively infrequent intervals whether the electrolyte used be acid or alkaline.

To this end the invention consists in effecting a discharge from the cell, can, or other receptacle of the escaping gases carrying the mechanically-entrained globules with them at such a velocity and in such a way that the gases will be directed against a film of the solution with sufficient force to overcome the surface tension thereof to thereby cause the entrained globules to coalesce with the film and permit the gases to escape in a substantially dry state free from any objectionable moisture. Preferably the operations described are performed automatically and intermittently by first permitting a definite pressure of gas to accumulate within the receptacle and by then providing for the escape of the gases at high velocity, as I shall presently more fully hereinafter describe and claim.

In an application for Letters Patent filed November 28, 1902, Serial No. 133,112, I describe, among other improvements in storage batteries, the provision of apparatus for carrying the improved method into effect and which I have claimed therein.

My present purpose is to describe and claim the method, which is carried out in the apparatus in question or in any other apparatus capable of utilizing the present invention.

In order that the invention may be better understood, attention is directed to the accompanying drawing, forming a part of this specification and wherein I have shown, partly in elevation and partly in section, a storage battery of my improved type equipped with a gas-separator designed to carry the method into effect.

The receptacle 1 is illustrated as a can containing the electrodes and which is made of any suitable material unaffected by the solution. For instance, in batteries of my improved type employing alkaline electrolytes the can is made of sheet-steel carefully nickel-plated, while in the case of batteries using acid solutions it may be made of lead or hard rubber. Secured in the top of the can with a tight joint is a neck 2, having a flat seat 3. Resting upon this seat is a mushroom, puppet, or check valve 4, having a weighted stem 5. Screwed into the neck 2 is a casing 6, formed with vents 7, and above said vents is a small deflector or dash plate 8. Secured over the mouth of the casing 6 is a disk of wire-gauze 9. The top of the can is also provided with a neck 10, having a hinged cover 11, furnished with a rubber packing 12, a spring 13 for normally opening the cover, and a yoke 14 for locking the cover in its normally closed position.

With a battery equipped with devices of this type and having to do solely with the generation, separation, and escape of the gases the operation is as follows: The check-valve 4 is normally closed by its weight, so that any gases which may be generated within the receptacle 1 will accumulate in the upper part of the receptacle above the electrolyte. As soon as the gas-pressure is sufficient to elevate the check-valve 4 the gases will be permitted to rush at a high velocity through the opening formed between the check-valve and the seat 3 and will forcibly impinge against the bore of the neck 2 and casing 6 to deposit liquid thereon and allow of the accumulation of a liquid film. This film coats the bore of the casing 6 all around the valve and also deposits on the seat 3. As soon as the pressure has been relieved by the escape of the gases the weight of the valve again closes it and the valve will be stuck to a certain extent upon its seat by the interposed film, just as two plates of glass will adhere quite strongly together if a film of liquid be interposed between them. The gas-pressure within the cell will therefore again rise until it finally becomes great enough to unseat the valve, which is suddenly forced upward. Consequently the gas again escapes at a high velocity through the space between the valve and the seat 3 and impinges against the liquid film with sufficient force to overcome the surface tension thereof, causing the entrained globules to coalesce with the film and being effectively separated from the gases, which escape through the vents 7 in a substantially dry and non-noxious condition. The accretion which the film thus receives causes a slight accumulation of liquid around the valve and the seat when the valve again seats itself, and when the valve again opens to repeat the separating operation the surplus liquid not retained by capillarity will flow back into the cell over the valve-seat. At all times, however, a film of liquid will be maintained within the bore of the casing 6, so that when the gas is projected through the space beneath the valve the velocity will be sufficient to overcome the surface tension of the film and permit the entrained globules to coalesce therewith. By thus causing the gas, with its entrained globules, to escape from the cell or other receptacle at high velocity and in such a way as to overcome the surface tension of the liquid film the entrained globules will coalesce with the latter and be effectively separated from the gas. Preferably these operations are performed intermittently and automatically, as explained, though obviously the same or an analogous method may be carried out in other ways. If for any reason the generation of gas within the cell should become so excessive that a complete separation of the gases and entrained globules is not effected immediately after the escape of the gases between the valve and its seat, a further separation will be effected by a rush of the gases through the vents 7 into contact with the dash-plate 8 with sufficient velocity to overcome the surface tension of any film of moisture which may be formed on the dash-plate. The particular purpose of the dash-plate 8, however, is not to effect a separation of mechanically-entrained globules from escaping gases or even to supplement the operation of the check-valve 4, but to cause the gases, which obviously are of a highly explosive nature, to be diluted and deflected so as to pass through the gauze 9 in an extremely rarefied and non-combustible condition. I find, in fact, that if the deflector 8 is not used these gases frequently pass through the vents 7 in a sufficiently concentrated form as to burn above the gauze, and when the gauze becomes too hot an explosion takes place beneath it which communicates with the gases within the cell, resulting in serious damage. When, however, the deflector is used, the gases are so diffused and attenuated that this result cannot take place. From time to time the water is replenished through the filling-neck 10 by unlocking the yoke 14 and allowing the spring 13 to open the cover 11. By employing a cover which thus opens automatically a visual indication is afforded the operator when the cell or other receptacle is not sealed. If the spring-cover were not used, there would be danger of the operator leaving it unlocked to permit of the escape of gases at that point instead of past the valve, as explained.

Preferably I arrange a diaphragm 15, having perforations therein, above the several plates, said diaphragm being made of hard rubber of any desired thickness. I find that when such a diaphragm is used overcharging of the cell causes the solution to froth, which rises until the diaphragm is reached and the latter is coated with a film which closes all the perforations therein, thereby forming a gas-tight seal above the level of the electrolyte. As the gas-pressure is permitted to accumulate below the diaphragm the latter may be actually buckled upward until the pressure is sufficient to break through one or more of the perforations, allowing the escape of the gas with sufficient velocity to overcome the surface tension of the deposited film on the under side of the top of the cell and effecting thereby a separation of the mechanically-entrained globules from the escaping gases. Such a perforated diaphragm can be effectively used to supplement the operation of the check-valve separator before described, and particularly when a violent generation of gases is produced by overcharging, but it is preferably not relied upon entirely to effect a separation between the solution and the gases, for the reason that when gassing is effected slowly the diaphragm is not coated with a film, since the solution is not caused to froth or foam, and consequently a separation of the globules is not secured.

Having now described my invention, what I claim is—

1. The method of separating, from the gases generated in a storage battery, mechanically-entrained globules, which consists in forming a liquid film in the path of the gases, and in directing the gases and entrained globules into contact with the film at sufficient velocity to overcome the surface tension of the film, whereby the entrained globules will coalesce with the film and be separated from the escaping gases, substantially as and for the purposes set forth.

2. The method of separating, from the gases generated in a storage battery, mechanically-entrained globules, which consists in forming a liquid film in the path of the escaping gases, and in intermittently projecting the escaping gases and entrained globules against the film at sufficient velocity to overcome the surface tension of the film, whereby the entrained globules coalesce with the film and become separated from the escaping gases, substantially as and for the purposes set forth.

3. The method of separating, from the gases generated in a storage battery, mechanically-entrained globules, which consists in withholding the escape of the gases until a gas-pressure is secured, in then suddenly releasing the pressure, and in permitting the gases to escape into contact with a liquid film at sufficient velocity to overcome the surface tension of the liquid film, whereby the mechanically-entrained globules coalesce with the film to be separated from the escaping gases, substantially as and for the purposes set forth.

4. The method of separating, from the gases generated in a storage battery, mechanically-entrained globules, which consists in withholding the escape of the gases until a gas-pressure is secured, in then suddenly releasing the pressure, in permitting the gases to escape into contact with a liquid film at sufficient velocity to overcome the surface tension of the liquid film whereby the mechanically-entrained globules coalesce with the film to be separated from the escaping gases, and simultaneously with the escape of the gases permitting the return to the solution of the surplus of the film not retained by capillarity, substantially as and for the purposes set forth.

5. The method of separating, from the gases generated in a storage battery, mechanically-entrained globules, and of rendering the same non-explosive, which consists in forming a liquid film in the path of the gases, in directing the gases and entrained globules into contact with the film with sufficient velocity to overcome the surface tension of the film whereby the entrained globules will coalesce with the film and be separated from the escaping gases, in passing the gases through a contracted vent, and in thereafter spreading, diffusing and attenuating the gases, substantially as and for the purposes set forth.

6. The method of separating, from the gases generated in a storage battery, mechanically-entrained globules and of rendering the same non-explosive, which consists in forming a liquid film in the path of the gases, in directing the gases and entrained globules into contact with the film with sufficient velocity to overcome the surface tension of the film whereby the entrained globules will coalesce with the film and be separated from the escaping gases, in passing the gases through a contracted vent, in thereafter spreading, diffusing and attenuating the gases, and in finally passing the attenuated gases through a cooling medium, substantially as and for the purposes set forth.

This specification signed and witnessed this 13th day of November, 1902.

THOS. A. EDISON.

Witnesses:
FRANK L. DYER,
J. F. RANDOLPH.